United States Patent
Iwamoto

(10) Patent No.: US 11,181,717 B2
(45) Date of Patent: Nov. 23, 2021

(54) OPTICAL SYSTEM AND IMAGING APPARATUS HAVING THE SAME

(71) Applicant: CANON KABUSHIKI KAISHA, Tokyo (JP)

(72) Inventor: Shunji Iwamoto, Utsunomiya (JP)

(73) Assignee: CANON KABUSHIKI KAISHA, Tokyo (JP)

(*) Notice: Subject to any disclaimer, the term of this patent is extended or adjusted under 35 U.S.C. 154(b) by 88 days.

(21) Appl. No.: 16/847,940

(22) Filed: Apr. 14, 2020

(65) Prior Publication Data

US 2020/0341248 A1 Oct. 29, 2020

(30) Foreign Application Priority Data

Apr. 25, 2019 (JP) .............................. JP2019-083698

(51) Int. Cl.
- *G02B 9/12* (2006.01)
- *G02B 15/14* (2006.01)
- *G02B 7/04* (2021.01)
- *G02B 13/00* (2006.01)

(52) U.S. Cl.
CPC ....... *G02B 9/12* (2013.01); *G02B 15/143103* (2019.08); *G02B 15/143503* (2019.08); *G02B 7/04* (2013.01); *G02B 13/006* (2013.01)

(58) Field of Classification Search
CPC . G02B 9/12; G02B 15/143103; G02B 13/006
USPC ................... 359/791, 784, 786, 787
See application file for complete search history.

(56) References Cited

U.S. PATENT DOCUMENTS

| | | | |
|---|---|---|---|
| 9,217,851 B2 | 12/2015 | Iwamoto | |
| 10,078,202 B2 | 9/2018 | Iwamoto | |
| 10,416,421 B2 | 9/2019 | Iwamoto | |
| 2014/0055659 A1 | 2/2014 | Iwamoto | |
| 2014/0334020 A1* | 11/2014 | Ono | G02B 9/12 359/740 |
| 2017/0199356 A1 | 7/2017 | Iwamoto | |
| 2019/0004277 A1 | 1/2019 | Iwamoto | |
| 2019/0011682 A1 | 1/2019 | Iwamoto | |
| 2020/0026047 A1* | 1/2020 | Hosoi | G02B 13/02 |

FOREIGN PATENT DOCUMENTS

| | | |
|---|---|---|
| JP | 2012181508 A | 9/2012 |
| JP | 2013195587 A | 9/2013 |
| JP | 2017207647 A | 11/2017 |

* cited by examiner

*Primary Examiner* — Kristina M Deherrera
(74) *Attorney, Agent, or Firm* — Carter, DeLuca & Farrell LLP

(57) ABSTRACT

An optical system includes, in order from an object side to an image side, a first lens unit having a positive refractive power, a second lens unit having a positive refractive power, and a third lens unit having a negative refractive power. The second lens unit moves during focusing and a distance between adjacent lens units changes. The second lens unit includes a cemented lens closest to an object. The cemented lens includes a positive lens and a negative lens disposed on the image side of the positive lens. A predetermined condition is satisfied.

13 Claims, 8 Drawing Sheets

OPTICAL SYSTEM AND IMAGING APPARATUS HAVING THE SAME

BACKGROUND OF THE INVENTION

Field of the Invention

The present invention relates to an optical system and an imaging apparatus having the same, suitable for an imaging optical system, such as a digital still camera, a digital video camera, a TV camera, a surveillance camera, and a film-based camera.

Description of the Related Art

An imaging optical system having a large diameter and a small Fno (F-number or aperture value) has conventionally been known as an imaging optical system used for an imaging apparatus, such as a digital camera and a video camera. The large-diameter imaging optical system is widely used for portrait imaging and indoor sports imaging. Such an imaging optical system is demanded for a short overall lens length, a small size, and quick focusing in the autofocus. It is effective for the quick focusing to trim the weight of the focus lens unit. Moreover, a lens is demanded for high optical performance with a high resolution and few chromatic aberration from infinity to a short distance over an entire image.

Japanese Patent Laid-Open No. ("JP") 2012-181508 discloses an optical system that includes, in order from an object side to an image side, a positive front unit, a positive intermediate unit, and a negative rear unit, and realizes a focusing method that has few aberration variations from infinity to a short distance with a relatively lightweight focus lens unit. This optical system is configured to move the intermediate lens unit to the object side during focusing.

Since the large-diameter optical system has a large lens diameter and the focus lens unit is heavy, a large driving force is required. Hence, the configuration disclosed in JP 2012-181508 has difficulties in obtaining an optical system that can provide quick focusing. In particular, as the number of lenses increases with higher image quality, it becomes more difficult to reduce the weight of the focus lens unit.

SUMMARY OF THE INVENTION

The present invention provides a compact, high-quality, large-diameter optical system that can provide quick focusing, and an imaging apparatus having the same.

An optical system according to one aspect of the present invention includes, in order from an object side to an image side, a first lens unit having a positive refractive power, a second lens unit having a positive refractive power, and a third lens unit having a negative refractive power. The second lens unit moves during focusing and a distance between adjacent lens units changes. The second lens unit includes a cemented lens closest to an object. The cemented lens includes a positive lens and a negative lens disposed on the image side of the positive lens. The following conditional expressions are satisfied:

$$-10.0 < (r2LAP + r1LAP)/(r2LAP - r1LAP) < -1.00$$

$$0.50 < (r2LAN + r1LAN)/(r2LAN - r1LAN) < 10.0$$

where $r1LAP$ is a radius of curvature of a surface of the positive lens on the object side, $r2LAP$ is a radius of curvature of a surface of the positive lens on the image side, $r1LAN$ is a radius of curvature of a surface of the negative lens on the object side, and $r2LAN$ is a radius of curvature of a surface of the negative lens on the image side.

An imaging apparatus according to another aspect of the present invention includes the above optical system, and an image sensor configured to receive light from the optical system.

Further features of the present invention will become apparent from the following description of exemplary embodiments with reference to the attached drawings.

DESCRIPTION OF THE EMBODIMENTS

Referring now to the accompanying drawings, a detailed description will be given of embodiments according to the present invention.

Figure 1:
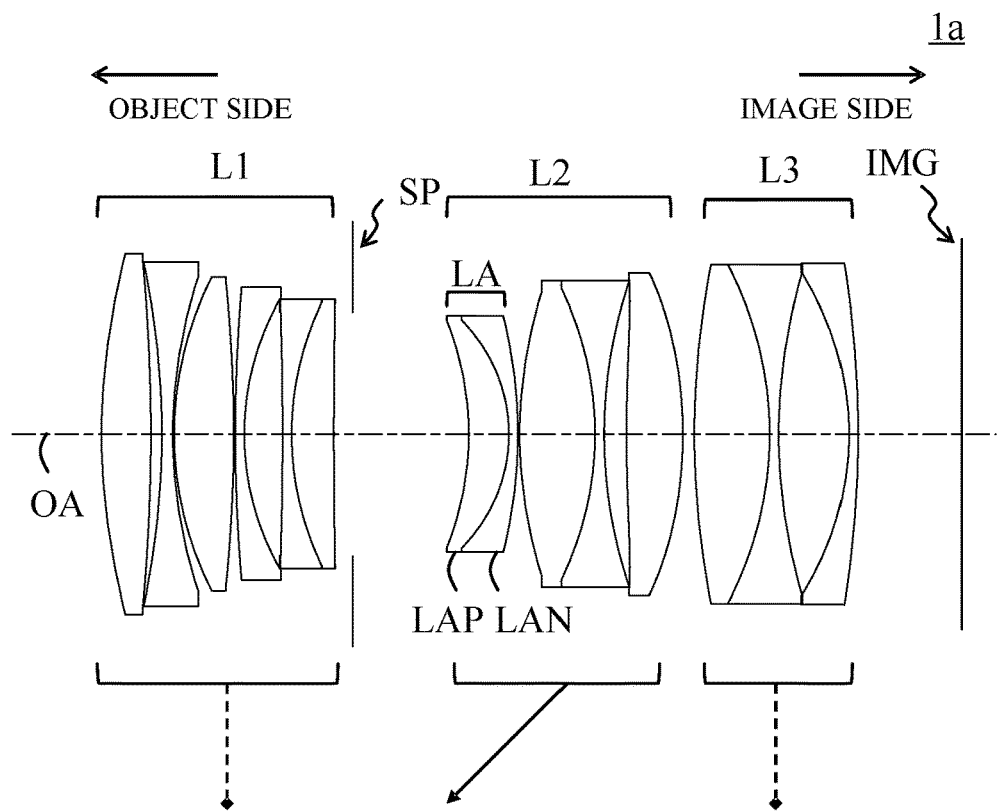
FIG. 1 is a sectional view of an optical system according to Example 1.
Figure 2:
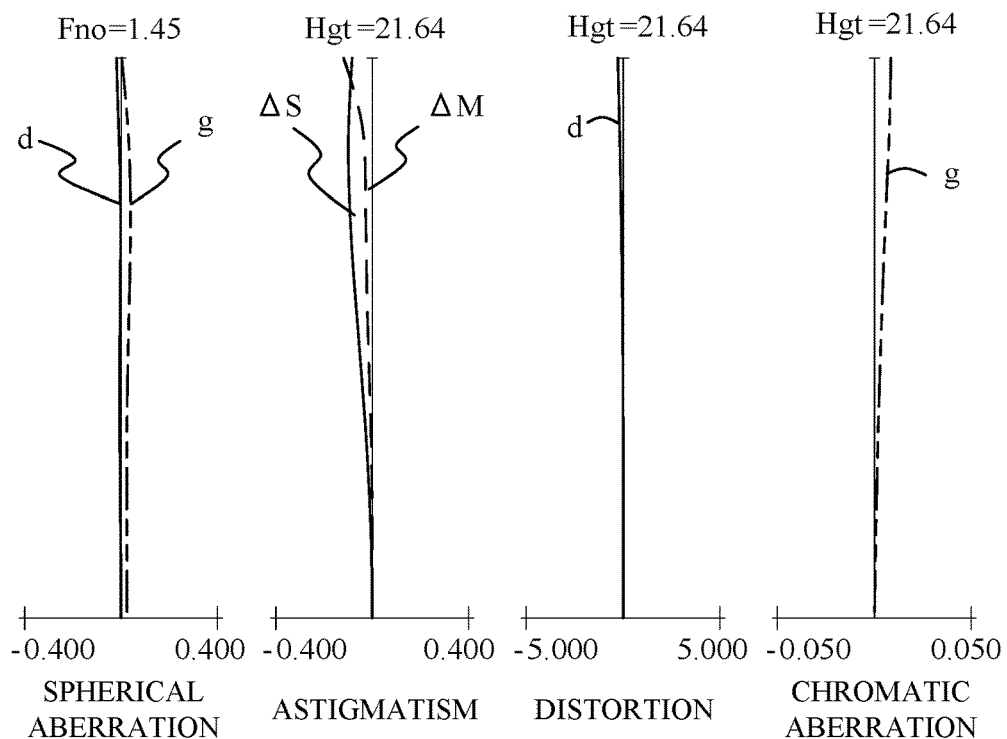
FIG. 2 is a longitudinal aberration diagram (infinity) of the optical system according to Example 1.
Figure 3:
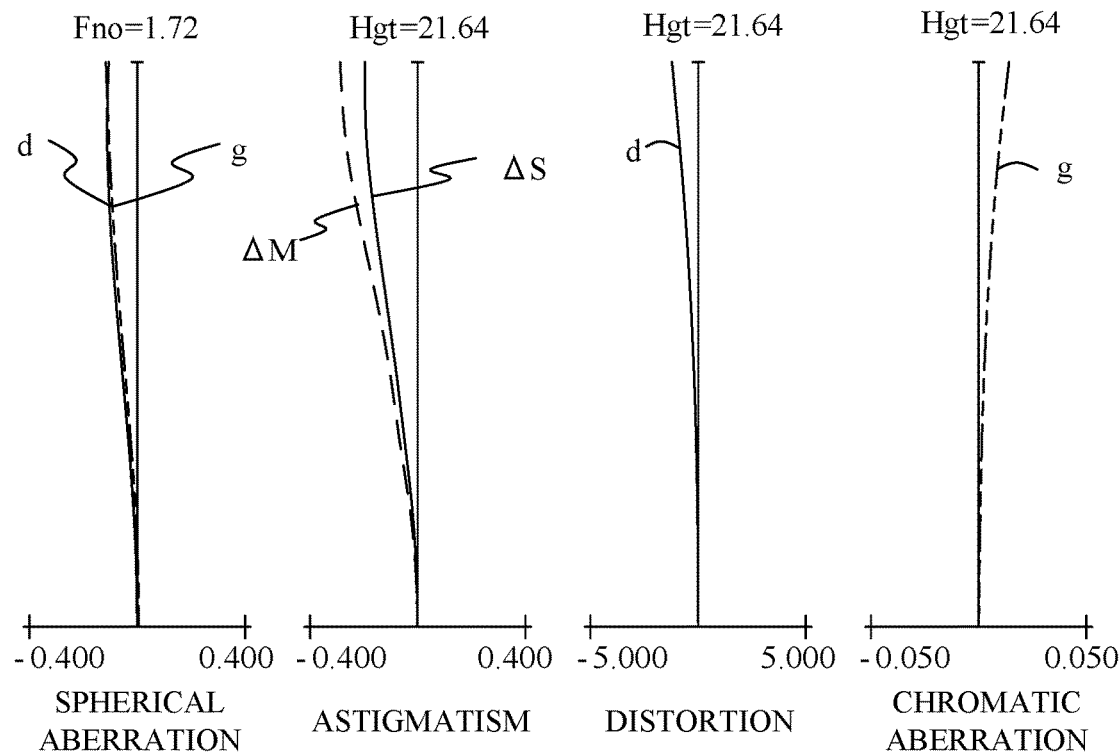
FIG. 3 is a longitudinal aberration diagram (lateral imaging magnification: −0.15 times) of the optical system according to Example 1.
Figure 4:
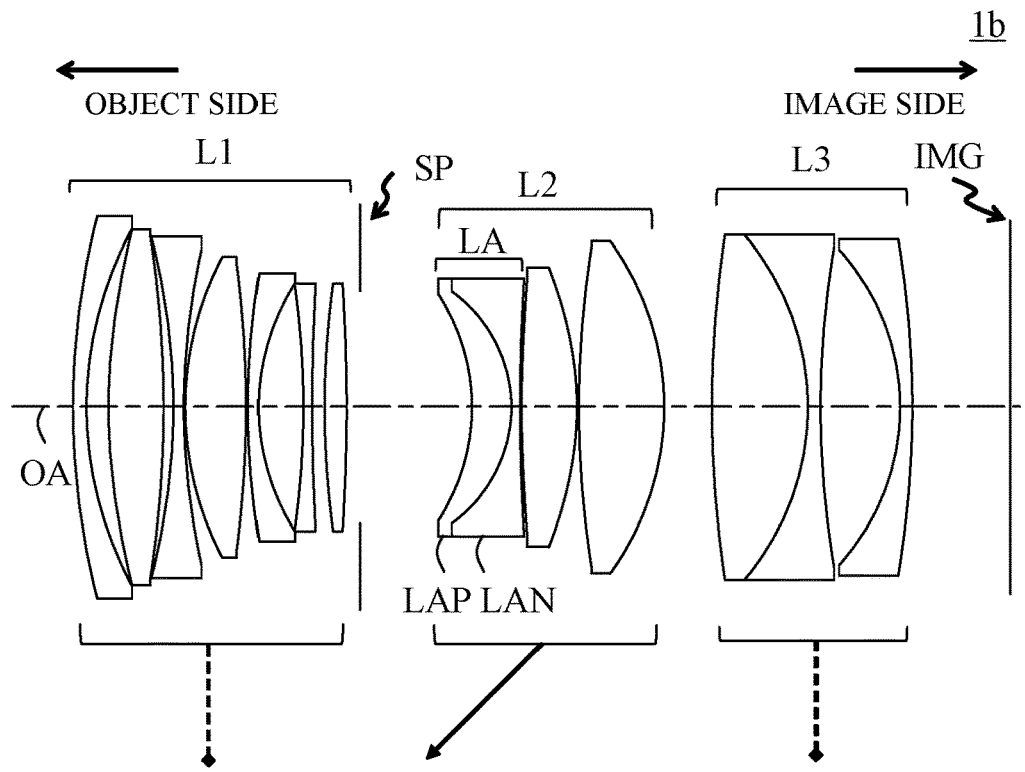
FIG. 4 is a sectional view of an optical system according to Example 2.
Figure 5:
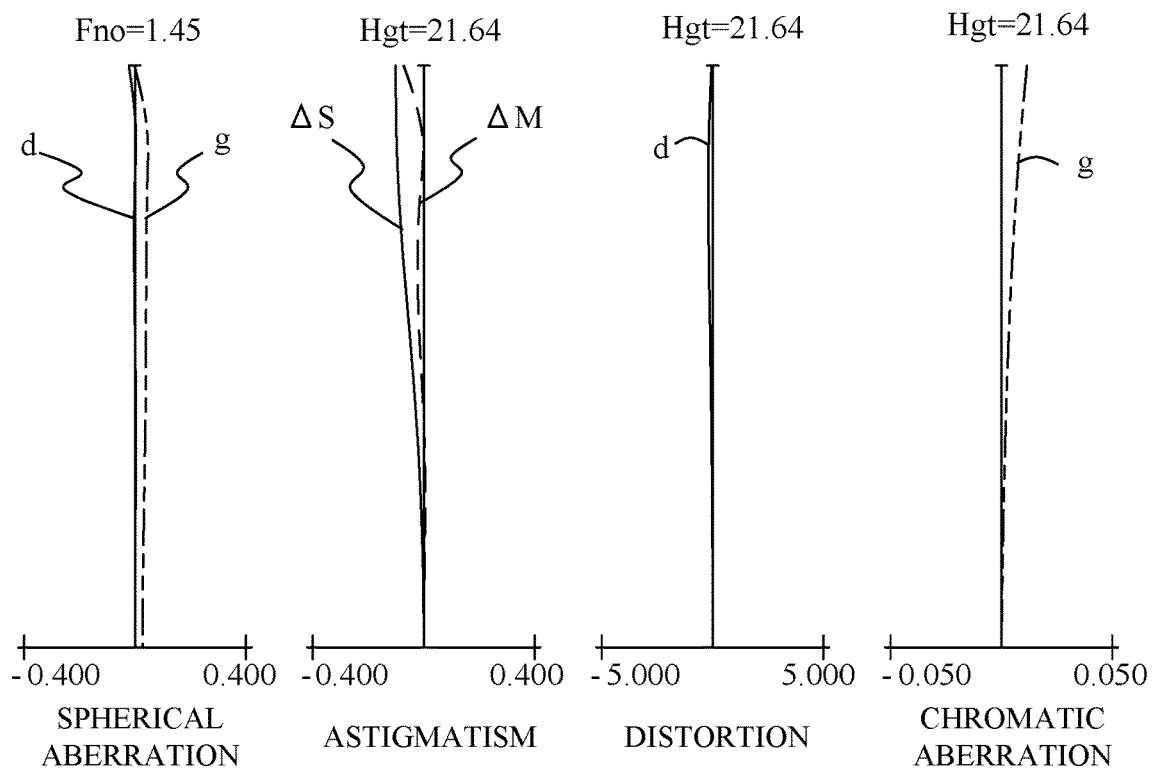
FIG. 5 is a longitudinal aberration diagram (infinity) of the optical system Example 2.
Figure 6:
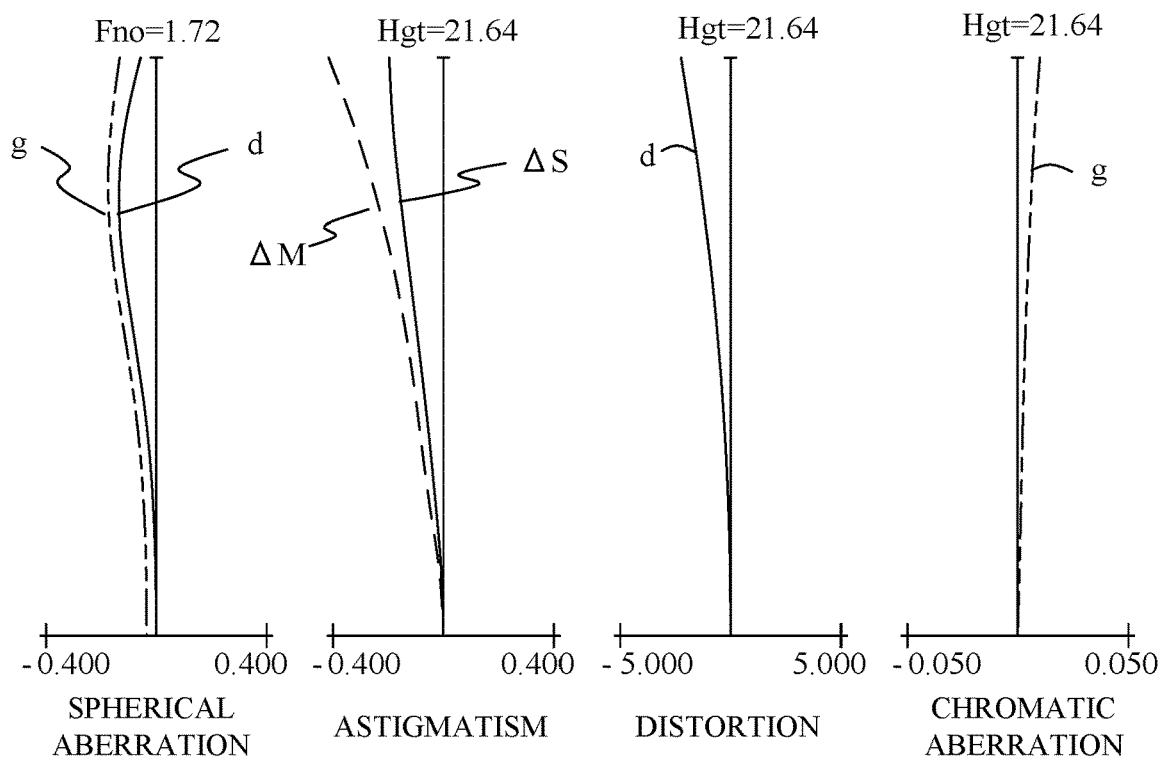
FIG. 6 is a longitudinal aberration diagram (lateral imaging magnification: −0.15 times) of the optical system according to Example 2.
Figure 7:
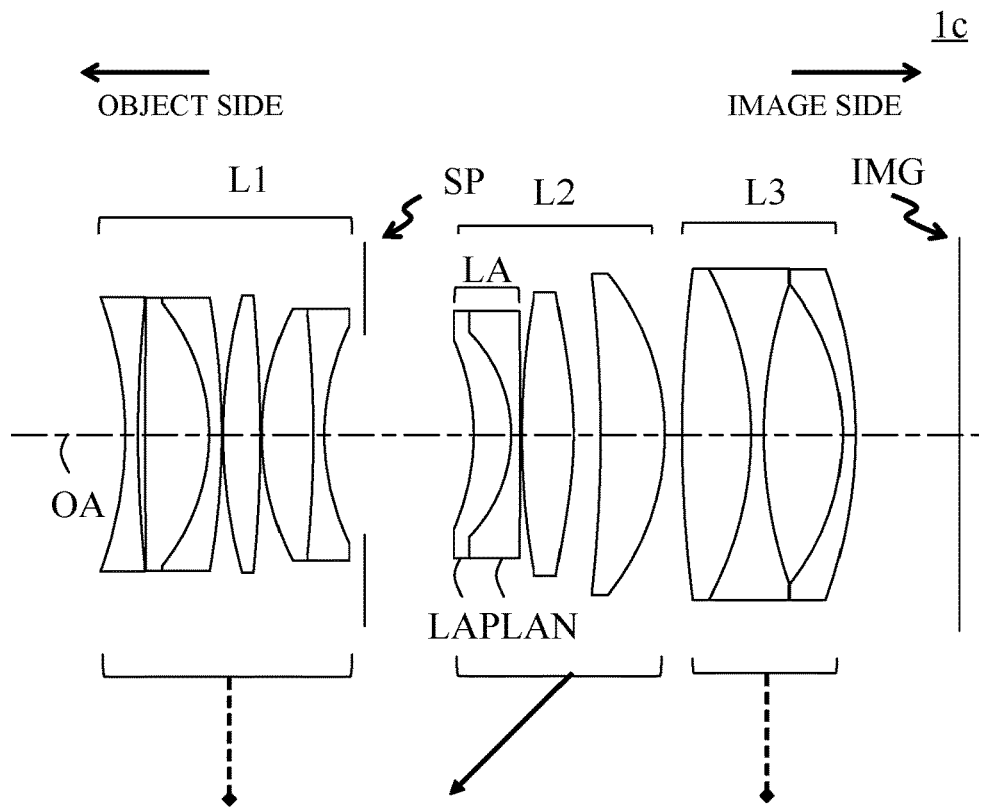
FIG. 7 is a sectional view of an optical system according to Example 3.
Figure 8:
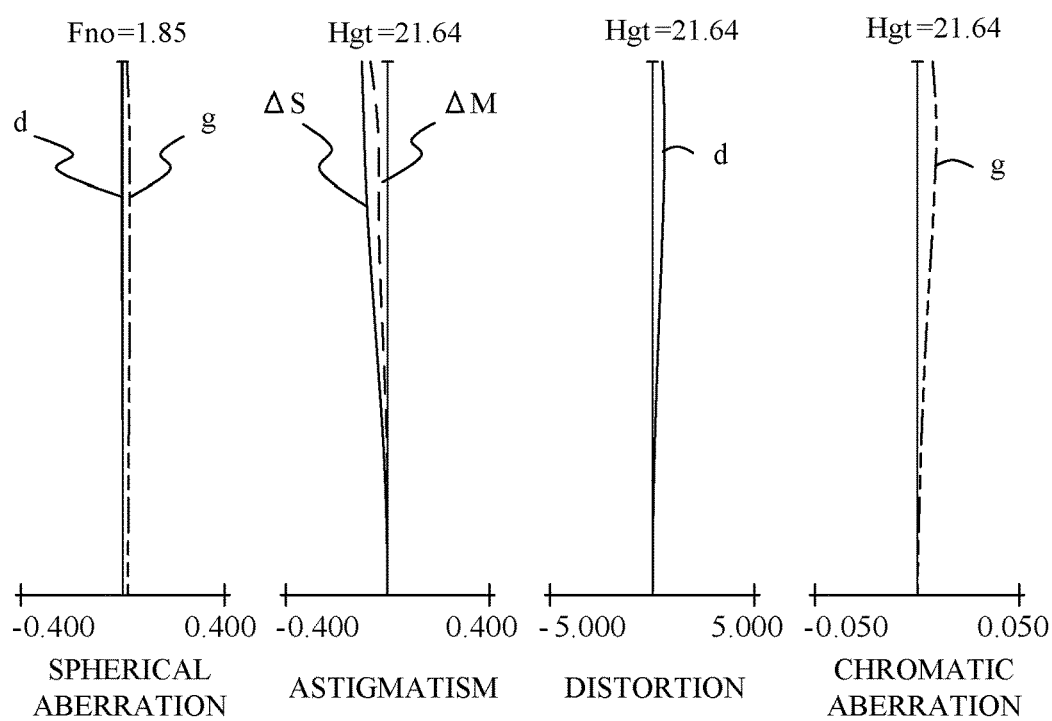
FIG. 8 is a longitudinal aberration diagram (infinity) of the optical system according to Example 3.
Figure 9:
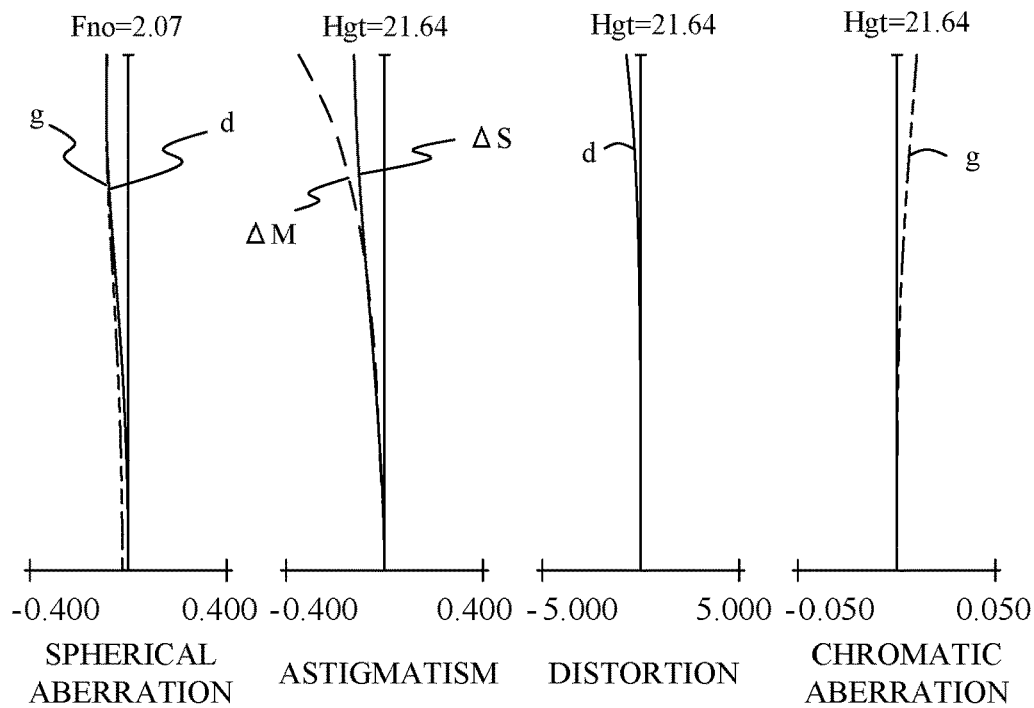
FIG. 9 is a longitudinal aberration diagram (lateral imaging magnification: −0.15 times) of the optical system according to Example 3.
Figure 10:
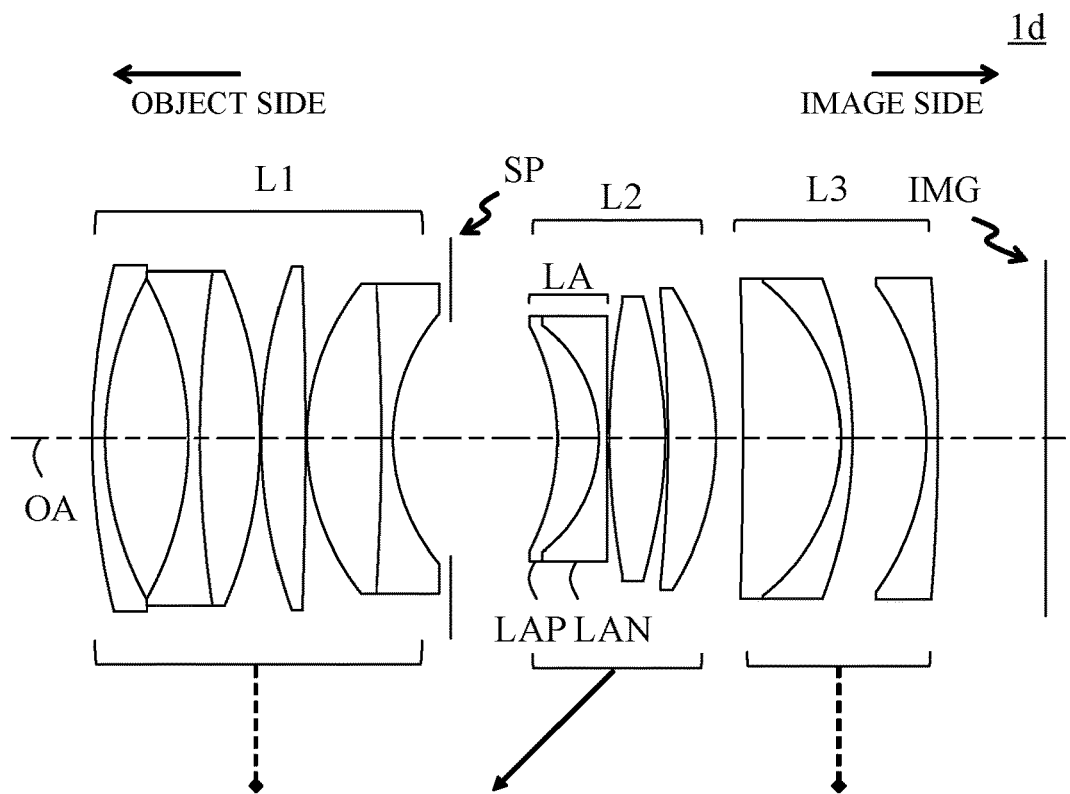
FIG. 10 is a sectional view of an optical system according to Example 4.
Figure 11:
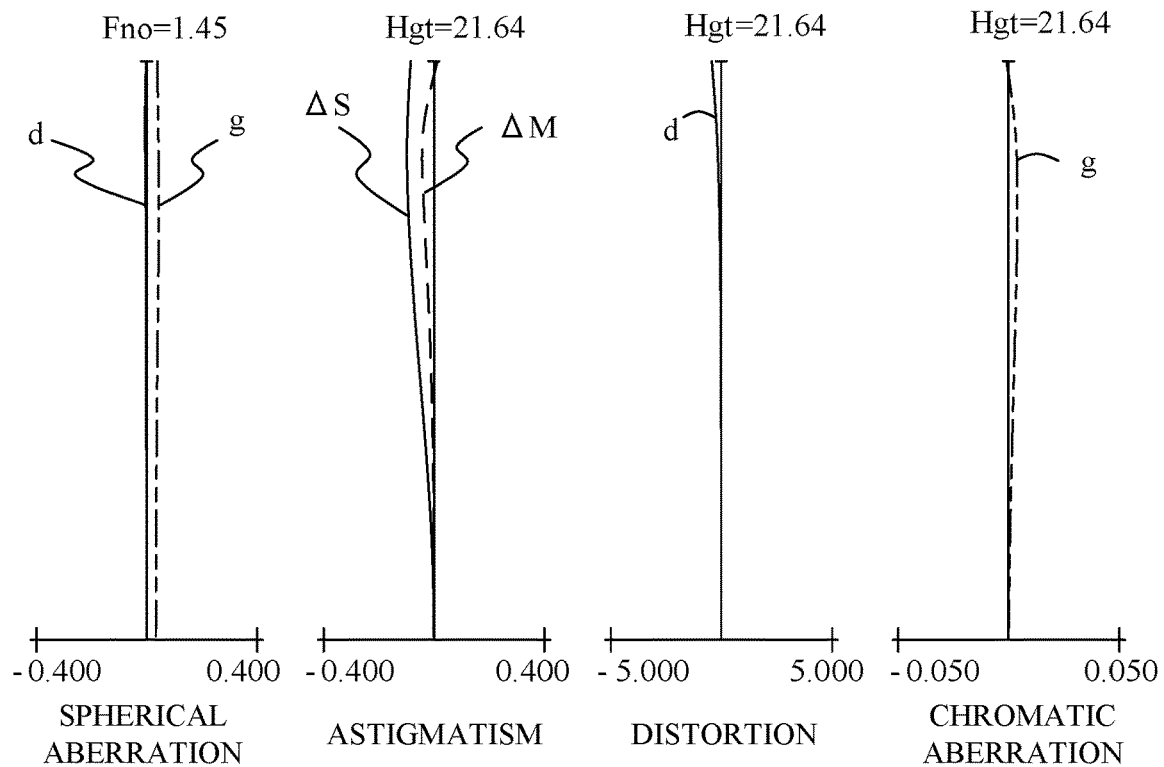
FIG. 11 is a longitudinal aberration diagram (infinity) of the optical system according to Example 4.
Figure 12:
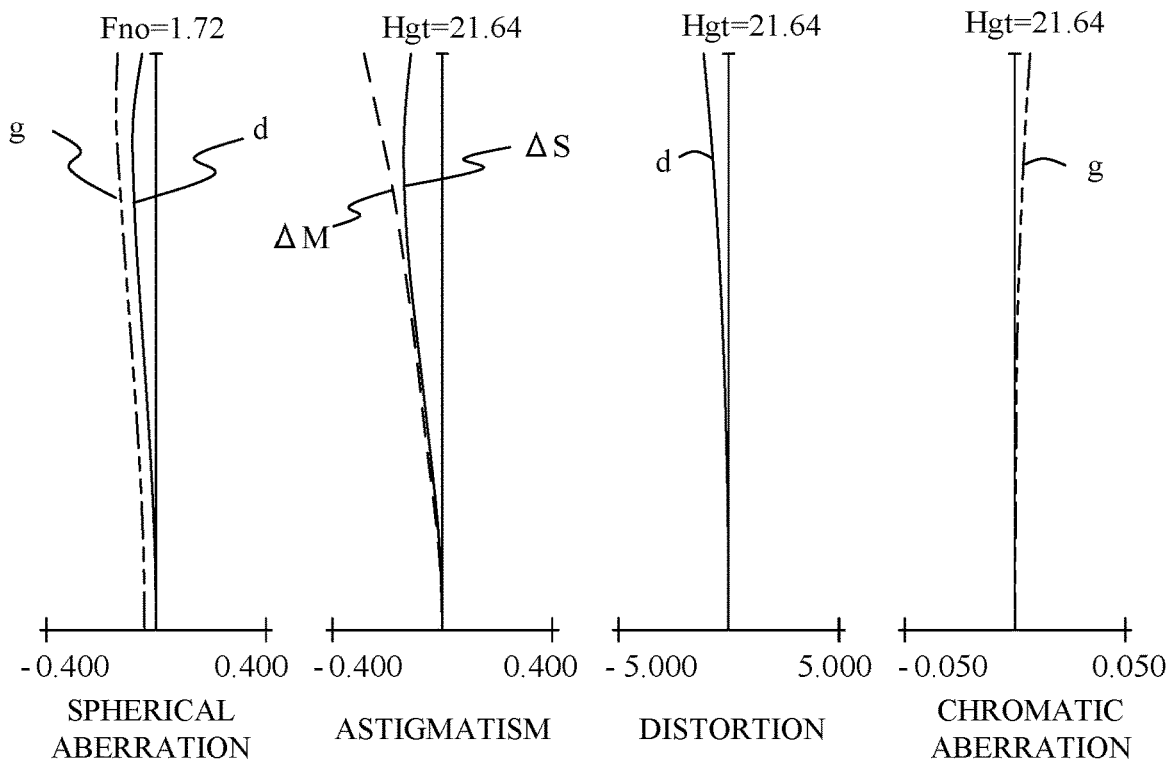
FIG. 12 is a longitudinal aberration diagram (lateral imaging magnification: −0.15 times) of the optical system according to Example 4.
Figure 13:
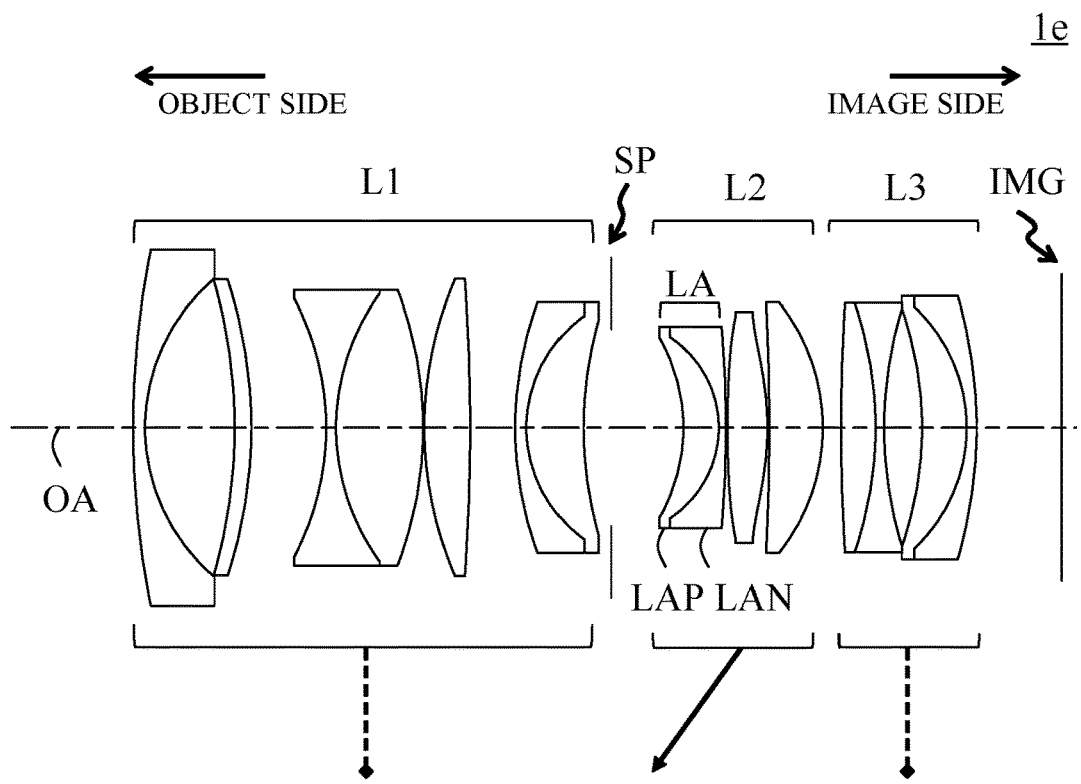
FIG. 13 is a sectional view of an optical system according to Example 5.
Figure 14:
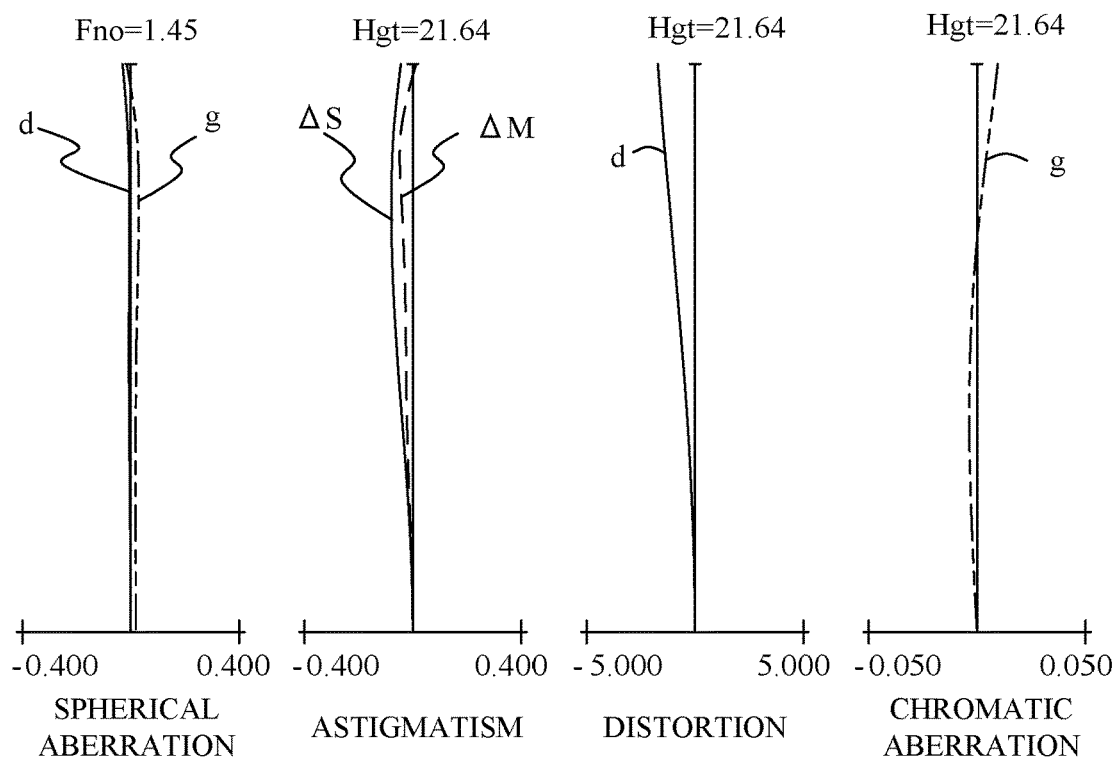
FIG. 14 is a longitudinal aberration diagram (infinity) of the optical system according to Example 5.
Figure 15:
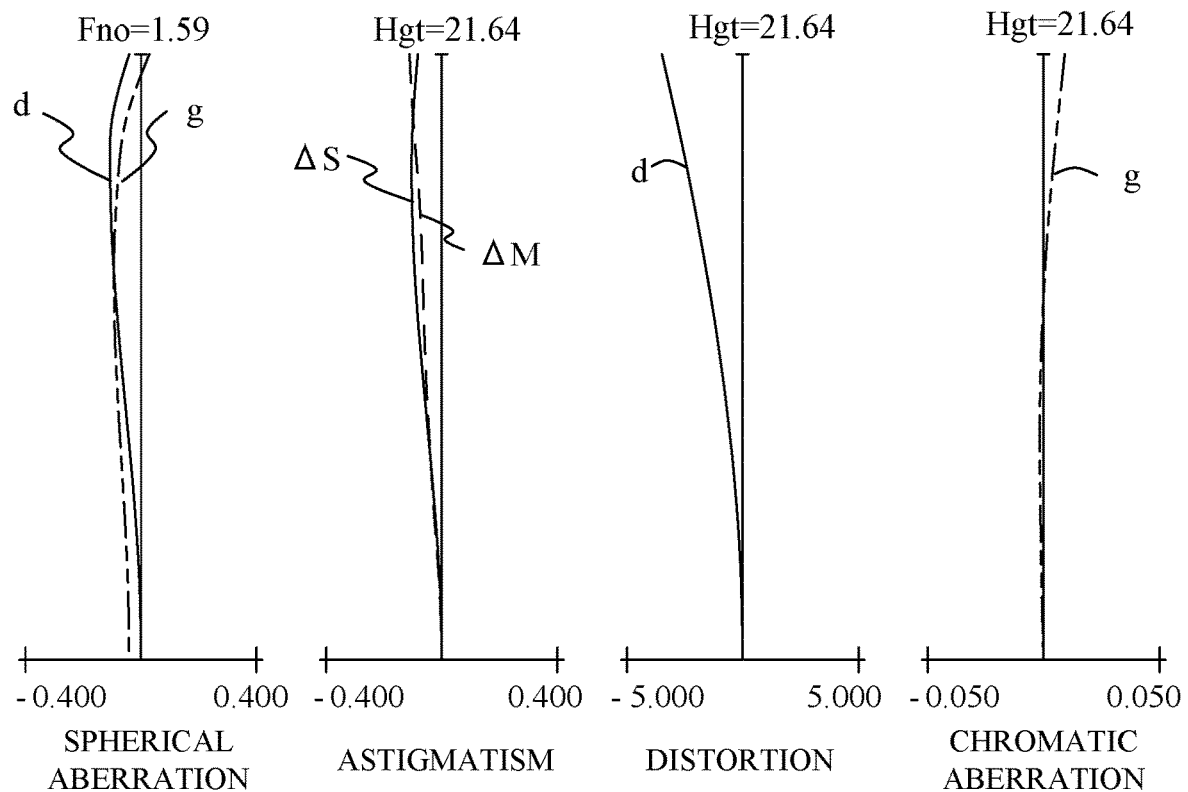
FIG. 15 is a longitudinal aberration diagram (lateral imaging magnification: −0.15 times) of the optical system according to Example 5.

Referring now to FIGS. 1 to 15, a description will be given of optical systems 1a to 1e according to Examples 1 to 5. FIG. 1 is a sectional view of the optical system 1a according to Example 1. FIG. 2 is a longitudinal aberration diagram (infinity) of the optical system 1a. FIG. 3 is a longitudinal aberration diagram (lateral imaging magnification: −0.15 times) of the optical system 1a. FIG. 4 is a sectional view of the optical system 1b according to Example 2. FIG. 5 is a longitudinal aberration diagram (infinity) of the optical system 1b. FIG. 6 is a longitudinal aberration diagram (lateral imaging magnification: −0.15 times) of the optical system 1b. FIG. 7 is a sectional view of the optical system 1c according to Example 3. FIG. 8 is a longitudinal aberration diagram (infinity) of the optical system 1c. FIG. 9 is a longitudinal aberration diagram (lateral imaging magnification: −0.15 times) of the optical system 1c. FIG. 10 is a sectional view of an optical system 1d according to Example 4. FIG. 11 is a longitudinal aberration diagram (infinity) of the optical system 1d. FIG. 12 is a longitudinal aberration diagram (lateral imaging magnification: −0.15 times) of the optical system 1d. FIG. 13 is a sectional view of the optical system 1e according to Example 5. FIG. 14 is a longitudinal aberration diagram (infinity) of the optical system 1e. FIG. 15 is a longitudinal aberration diagram (lateral imaging magnification: −0.15 times) of the optical system 1e.

Each of the optical systems 1a to 1e according to each example is an imaging lens system used for an imaging apparatus (image pickup apparatus) such as a video camera, a digital camera, and a film-based camera. In FIGS. 1, 4, 7, 10, and 13, the left side is the object side (front) and the right side is the image side (rear). As illustrated in FIGS. 1, 4, 7, 10, and 13, each of the optical systems 1a to 1e has a plurality of lens units. The plurality of lens units include, in order from the object side to the image side, a first lens unit L1 having a positive refractive power, a second lens unit L2 having a positive refractive power, and a third lens unit L3 having a negative refractive power. During focusing, a distance between adjacent lens units changes as the second lens unit L2 moves along the optical axis OA. By disposing the first lens unit L1 having the positive refractive power on the object side of the second lens unit L2, it becomes easy to converge the on-axis light flux and to reduce the diameter of the lens disposed on the image side of the first lens unit L1. Thereby, the weight of the second lens unit L2, serving as the focus lens unit, can be reduced.

In FIGS. 1, 4, 7, 10, and 13, SP denotes an aperture stop (diaphragm), which is disposed between the first lens unit L1 and the second lens unit L2. IMG denotes an image plane, on which an imaging plane of an image sensor (photoelectric conversion element), such as a CCD sensor and a CMOS sensor, and a photosensitive surface corresponding to the surface is placed when used as an imaging optical system of a video camera or a digital still camera. An arrow illustrated in FIGS. 1, 4, 7, 10, and 13 denotes a moving locus of each lens unit during focusing.

In the aberration diagrams of FIGS. 2, 3, 5, 6, 8, 9, 11, 11, 12, and 15, d and g denote the d-line and the g-line, respectively. ΔM and ΔS denote a meridional image plane and a sagittal image plane, respectively. Fno denotes an F-number (aperture value), and Hgt denotes an image height.

In order to obtain an optical system that provides quick focusing and high image quality, it is important to properly set the focusing method, power arrangement, and lens configuration. For quick focusing, weight saving of the focus lens unit is important.

In order to save the weight of the focus lens unit, it is important to properly set the configuration of the second lens unit L2. In the optical systems 1a to 1e according to the respective examples, the second lens unit L2 has a cemented lens LA closest to the object. The cemented lens LA is a cemented lens having a positive lens LAP and a negative lens LAN in order from the object side to the image side. The cemented lens LA disposed closest to the object in the second lens unit L2 has an intermediate portion where the lens diameter is likely to be made small in the optical systems 1a to 1e. Hence, it is possible to effectively correct the axial chromatic aberration and the Petzval sum.

In order to well correct the longitudinal chromatic aberration and the Petzval sum, a cemented lens having a small absolute value of the radius of curvature of the cemented surface may be disposed. On the other hand, when the lens having the small absolute value of the radius of curvature of the cemented surface is disposed, the incident angle of the off-axis light beam becomes large and it becomes difficult to correct the lateral chromatic aberration. The positive lens LAP is a meniscus lens having a convex surface facing the image side. The negative lens LAN is a meniscus lens or a biconcave lens having a concave surface facing the object side. Thereby, the angle of incidence of the off-axis light beam on each surface can be made small, and it becomes easy to correct the axial chromatic aberration and the Petzval sum, and the lateral chromatic aberration.

The optical systems 1a to 1e according to each example satisfy the following conditional expressions (1) and (2).

$$-10.0 < (r2LAP+r1LAP)/(r2LAP-r1LAP) < -1.00 \quad (1)$$

$$0.50 < (r2LAN+r1LAN)/(r2LAN-r1LAN) < 10.0 \quad (2)$$

In the conditional expressions (1) and (2), r1LAP is a radius of curvature of a surface of the positive lens on the object side LAP, r2LAP is a radius of curvature of a surface of the positive lens on the image side LAP, and r1LAN is a radius of curvature of a surface of the negative lens on the object side LAN, r2LAN is a radius of curvature of a surface of the negative lens on the image side LAN.

The conditional expression (1) defines the shape of the positive lens LAP. If the value is lower than the lower limit of the conditional expression (1) and the absolute value of the radius of curvature of the positive lens LAP on the image side becomes smaller, the incident angle of the on-axis light increases and it becomes difficult to correct the spherical aberration. On the other hand, when the value is higher than the upper limit of the conditional expression (1) and the absolute value of the radius of curvature of the positive lens LAP on the image side becomes larger, the incident angle of the off-axis light increases and it becomes difficult to correct the lateral chromatic aberration.

The conditional expression (2) defines the shape of the negative lens LAN. If the value is lower than the lower limit of the conditional expression (2) and the absolute value of the radius of curvature of the negative lens LAN on the object side becomes larger, the incident angle of the off-axis light on the negative lens LAN increases and it becomes difficult to correct the lateral chromatic aberration. On the other hand, if the value is higher than the upper limit of the conditional expression (2) and the absolute value of the radius of curvature of the positive lens LAP on the image side becomes larger, the incident angle of on-axis light becomes larger and it becomes difficult to correct the spherical aberration.

The optical system according to each example may satisfy at least one of the following conditional expressions (3) to (9):

$$0.81 < |D12/r2LAP| 2.00 \quad (3)$$

$$0.002 < (nLAN-nLAP)/(nLAN+nLAP) < 0.075 \quad (4)$$

$$1.00 < f1/f < 5.00 \quad (5)$$

$$0.10 < f2/f < 1.20 \quad (6)$$

$$0.50 < |f3|/f < 10.00 \quad (7)$$

$$0.50 < D12/sk < 2.50 \quad (8)$$

$$1.00 < td/f < 6.00 \quad (9)$$

In the conditional expressions (3) to (9), D12 is a distance on the optical axis from the surface closest to the image of the first lens unit L1 to the surface closest to the object of the second lens unit L2. nLAP is a refractive index of the positive lens LAP for the d-line. nLAN is a refractive index of the negative lens LAN for the d-line. f is a focal length when the optical system (entire system) is focused on infinity. f1 is a focal length of the first lens unit L1. f2 is a focal length of the second lens unit L2. f3 is a focal length of the third lens unit L3. sk is a backfocus (distance from the lens surface closest to the image to the image plane IMG) expressed in terms of the air conversion length. td is an overall lens length of the optical system. Here, the "overall lens length" is a length obtained by adding the backfocus to the distance on the optical axis from the front surface (the lens surface closest to the object) of the optical system to the final surface or a distance on the optical axis from the surface closest to the object to the image plane IMG of the optical system.

The conditional expression (3) defines a relationship between the distance between the first lens unit L1 and the second lens unit L2 and a surface of the positive lens on the image side LAP or the radius of curvature of the image side surface of the cemented surface of the cemented lens LA. If the value is higher than the upper limit of the conditional expression (3) and the absolute value of the radius of curvature of the cemented surface of the cemented lens LA becomes smaller, it becomes difficult to correct the spherical aberration. On the other hand, when the value is lower than the lower limit of the conditional expression (3) and the absolute value of the radius of curvature of the cemented surface of the cemented lens LA becomes larger, it becomes difficult to correct the longitudinal chromatic aberration and the Petzval sum.

The conditional expression (4) defines a relationship between the refractive index of the negative lens LAN and the refractive index of the positive lens LAP. The refractive index of the negative lens LAN made larger than that of the positive lens LAP and the cemented surface having a negative refractive power can particularly facilitate a correction of the high-order spherical aberration. If the value is higher than the upper limit of the conditional expression (4) and the refractive index of the negative lens LAN becomes large, the correction of the Petzval sum runs short and the field curvature increases. On the other hand, when the value is smaller than the lower limit of the conditional expression (4) and the refractive index difference becomes small, the correction of the high-order spherical aberration becomes insufficient.

The conditional expression (5) defines a relationship between the focal length f1 of the first lens unit L1 and the focal length f of the optical system (entire system). If the value is higher than the upper limit of the conditional expression (5) and the focal length f1 of the first lens unit L1 becomes large, the lens diameter of the second lens unit L2 increases and it becomes difficult to save the weight of the focus lens unit. On the other hand, when the value is lower than the lower limit of the conditional expression (5) and the focal length f1 of the first lens unit L1 becomes smaller, the incident angle of the axial light on the second lens unit L2 increases and the spherical aberration fluctuations increase during focusing.

The conditional expression (6) defines a relationship between the focal length f2 of the second lens unit L2 and the focal length f of the optical system (entire system). If the value is higher than the upper limit of the conditional expression (6) and the focal length f2 of the second lens unit L2 becomes large, a focus moving amount increases and quick focusing becomes difficult. On the other hand, if the value is lower than the lower limit of the conditional expression (6) and the focal length f2 of the second lens unit L2 becomes small, the aberrational fluctuations during focusing, particularly the astigmatism fluctuations increases.

The conditional expression (7) defines a relationship between the focal length f3 of the third lens unit L3 and the focal length f of the optical system (entire system). If the value is higher than the upper limit of the conditional expression (7) and the focal length f3 of the third lens unit L3 becomes larger, the Petzval sum is insufficiently corrected and the field curvature increases. On the other hand, when the value is lower than the lower limit of the conditional expression (7) and the focal length f3 of the third lens unit L3 becomes small, the distortion increases.

The conditional expression (8) defines a ratio between the distance between the first lens unit L1 and the second lens unit L2 and the backfocus. If the value is higher than the upper limit of the conditional expression (8) and the distance between the first lens unit L1 and the second lens unit L2 becomes large or the backfocus becomes small, the second lens unit L2 becomes closer to the image plane IMG and the lens diameter becomes larger. Therefore, it is difficult to reduce the weight of the focus lens unit. On the other hand, if the value is lower than the lower limit of the conditional expression (8) and the backfocus increases, the size of the lens increases. In addition, if the value is lower than the lower limit of the conditional expression (8) and the distance between the first lens unit L1 and the second lens unit L2 becomes small, it becomes difficult to secure a space for focusing and focusing up to the short distance becomes difficult.

The conditional expression (9) defines a relationship between the distance td (or the overall lens length) on the optical axis from the surface closest to the object of the optical system to the image plane IMG and the focal length f. If the value is higher than the upper limit of the conditional expression (9) and the overall lens length becomes long, the front lens diameter becomes large. On the other hand, if the value is lower than the lower limit of the conditional expression (9) and the overall lens length becomes short, it becomes difficult to correct various aberrations, particularly the spherical aberration and coma.

The optical system according to each example may satisfy at least one of the following conditional expressions (1A) to (9A):

$$-5.66 < (r2LAP + r1LAP)/(r2LAP - r1LAP) < -3.00 \tag{1A}$$

$$0.80 < (r2LAN + r1LAN)/(r2LAN - r1LAN) < 2.20 \tag{2A}$$

$$0.86 < |D12/r2LAP| < 1.67 \tag{3A}$$

$$0.009 < (nLAN - nLAP)/(nLAN + nLAP) < 0.065 \tag{4A}$$

$$1.28 < f1/f < 3.66 \tag{5A}$$

$$0.20 < f2/f < 0.80 \tag{6A}$$

$$1.10 < |f3|/f < 6.43 \tag{7A}$$

$$1.10 < D12/sk < 1.59 \tag{8A}$$

$$1.50 < td/f < 4.25 \tag{9A}$$

The optical system according to each embodiment may satisfy at least one of the following conditional expressions (1B) to (9B):

$$-5.40 < (r2LAP + r1LAP)/(r2LAP - r1LAP) < -3.20 \quad (1B)$$

$$0.86 < (r2LAN + r1LAN)/(r2LAN - r1LAN) < 2.10 \quad (2B)$$

$$0.96 < |D12/r2LAP| < 1.57 \quad (3B)$$

$$0.013 < (nLAN - nLAP)/(nLAN + nLAP) < 0.060 \quad (4B)$$

$$1.59 < f1/f < 3.36 \quad (5B)$$

$$0.28 < f2/f < 0.72 \quad (6B)$$

$$1.79 < |f3|/f < 5.75 \quad (7B)$$

$$1.16 < D12/sk < 1.53 \quad (8B)$$

$$1.83 < td/f < 3.90 \quad (9B)$$

In order to obtain an optical system that has high image quality and a lightweight focus lens unit, it is important to properly set the configuration of each lens unit. The first lens unit L1 has a high ray height of on-axis light. Thus, it is important to properly set the configuration of the first lens unit L1 in order to properly correct the spherical aberration and axial chromatic aberration. The first lens unit L1 may have three positive lenses. This facilitates corrections of the Petzval sum and the spherical aberration. The first lens unit L1 may have at least two biconvex lenses. This makes it possible to reduce the overall lens length and to correct the Petzval sum. The first lens unit L1 may have three negative lenses. This makes it possible to achieve both the correction of the longitudinal chromatic aberration and the correction of the Petzval sum. The first lens unit L1 may have at least one negative meniscus lens. The distortion can be easily corrected by disposing a negative meniscus lens having a concave surface facing the image side. A negative meniscus lens having a concave surface facing the object side may be provided. This facilitates the correction of the spherical aberration. The first lens unit L1 may include an aspheric lens. Thereby, it is easy to correct the spherical aberration and to shorten the overall lens length.

Since the second lens unit L2 is a focus lens unit that moves during focusing, it is important to properly set the configuration of the second lens unit L2 in order to suppress the aberrational fluctuations during focusing. The second lens unit L2 may have three positive lenses and one negative lens. By sharing the positive refractive power of the second lens unit L2 with the three positive lenses, it is possible to properly correct the aberration fluctuations during focusing, in particular, the spherical aberration fluctuations. In addition, by disposing a negative lens, it is possible to properly correct the aberration fluctuations during focusing, particularly the longitudinal chromatic aberration fluctuations. The second lens unit L2 may include an aspheric lens. This facilitates corrections of various aberrations, particularly the coma.

Since the third lens unit L3 is close to the image plane IMG, it is important to properly set the configuration of the third lens unit L3 in order to properly correct the off-axis aberrations, particularly the distortion and the lateral chromatic aberration. The third lens unit L3 may have two negative lenses and one positive lens. Since the negative refractive power of the third lens unit L3 is shared by the two negative lenses, it becomes easy to properly correct the distortion. In addition, the positive lens can easily correct the lateral chromatic aberration.

The aperture stop SP may be disposed between the first lens unit L1 and the second lens unit L2. Thereby, the power arrangement is symmetrical with respect to the aperture stop SP, and it becomes easy to correct various aberrations, particularly, the distortion and the lateral chromatic aberration. In addition, the focusing mechanism can be made simpler by fixing it relative to the image plane IMG during focusing.

A description will be given of Numerical Examples 1 to 5 corresponding to Examples 1 to 5, respectively. In the surface data of each numerical example, r denotes a radius of curvature of each optical surface, and d (mm) denotes an axial distance (distance on the optical axis) between the m-th surface and the (m+1)-th surface. Herein, m is a surface number counted from the light incident side. nd denotes a refractive index of each optical element for the d-line, and vd denotes an Abbe number of the optical element for the d-line. The Abbe number vd of a certain material is expressed as follows where Nd, NF, and NC are the refractive indices for the d-line (587.6 nm), the F-line (486.1 nm), and the C-line (656.3 nm) of the Fraunhofer line:

$$Nd = (Nd - 1)/(NF - NC)$$

In each numerical example, each of d, focal length f (mm), F-number Fno, and a half angle of view (degree) has a value when the optical system according to each example focuses on an object at infinity. The "backfocus" is a distance expressed on the optical axis from the final lens surface (the lens surface closest to the image) to the paraxial image surface expressed in terms of the air conversion length. The "lens unit" is not limited to one including a plurality of lenses, but may be one including only a single lens.

In addition, an optical surface that is an aspherical surface is labelled by a symbol * on the right side of the surface number. The aspherical shape is expressed by the following expression where X denotes a displacement amount from a surface vertex in the optical axis direction, h denotes a height from the optical axis in a direction orthogonal to the optical axis, R denotes a paraxial radius of curvature, k denotes a conic constant, A4, A6, A8, A10, and A12 are aspherical coefficients of the respective orders:

$$X = \frac{(1/R)}{1 + \sqrt{1 - (1+K)(H/R)^2}} + A_2 H^2 + A_4 H^4 + A_6 H^6 + A_8 H^8 + A_{10} H^{10} + A_{12} H^{12}$$

Herein, "e±XX" in each aspheric coefficient means "×10$^{±xx}$". Table 1 shows a relationship between the conditional expressions (1) to (9) ("CE(1) to CD(9)") and various numerical values in Numerical Examples 1 to 5 ("NE1 to NE5").

Numerical Example 1

UNIT: mm
SURFACE DATA

| SURFACE NO. | r | d | nd | vd |
|---|---|---|---|---|
| 1* | 71.852 | 5.48 | 2.00100 | 29.1 |
| 2 | −202.067 | 1.22 | | |
| 3 | −89.666 | 1.20 | 1.62004 | 36.3 |
| 4 | 54.866 | 0.15 | | |
| 5 | 38.256 | 6.62 | 1.76385 | 48.5 |
| 6 | −160.413 | 0.15 | | |
| 7 | 182.744 | 1.00 | 1.66565 | 35.6 |

-continued

| | | | | |
|---|---|---|---|---|
| 8 | 30.235 | 4.19 | | |
| 9 | −410.421 | 1.00 | 1.72825 | 28.5 |
| 10 | 33.431 | 4.68 | 1.76385 | 48.5 |
| 11 | 798.612 | 2.11 | | |
| 12 (stop) | ∞ | (variable) | | |
| 13 | −33.445 | 4.44 | 1.43875 | 94.7 |
| 14 | −17.786 | 1.00 | 1.61340 | 44.3 |
| 15 | −53.187 | 0.19 | | |
| 16 | 51.699 | 8.29 | 1.83481 | 42.7 |
| 17 | −36.557 | 1.00 | 1.66565 | 35.6 |
| 18 | 52.710 | 2.48 | | |
| 19* | 163.415 | 6.27 | 1.80400 | 46.6 |
| 20* | −46.554 | (variable) | | |
| 21 | 95.245 | 8.36 | 1.90043 | 37.4 |
| 22 | −40.101 | 1.00 | 1.62004 | 36.3 |
| 23 | 62.492 | 7.74 | | |
| 24 | −33.197 | 1.00 | 1.62004 | 36.3 |
| 25 | −118.174 | 11.49 | | |
| Image plane | ∞ | | | |

Aspheric data

First surface

K = 0.00000e+000 A 4 = −8.98602e−007
A 6 = −5.53347e−010 A 8 = 7.96944e−013
A10 = −1.23679e−015

Nineteenth surface

K = 0.00000e+000 A 4 = −3.93724e−006
A 6 = −8.96103e−009 A 8 = 2.91724e−012
A10 = −3.62538e−014

Twentieth surface

K = 0.00000e+000 A 4 = 8.43521e−007
A 6 = −6.99026e−009 A 8 = 3.02543e−012
A10 = −2.99643e−014

| | |
|---|---|
| Focal length | 51.50 |
| F-number | 1.45 |
| Half angle of view (°) | 22.79 |
| Image height | 21.64 |
| Overall lens length | 95.19 |
| BF | 11.49 |
| d12 | 12.88 |
| d20 | 1.25 | lens unit data

| unit | starting surface | focal length |
|---|---|---|
| 1 | 1 | 128.82 |
| 2 | 13 | 48.98 |
| 3 | 21 | −190.11 |

Numerical Example 2

UNIT: mm
SURFACE DATA

| SURFACE NO. | r | d | nd | vd |
|---|---|---|---|---|
| 1 | 87.803 | 1.60 | 1.51633 | 64.1 |
| 2 | 43.152 | 2.54 | | |
| 3* | 72.157 | 6.43 | 2.00100 | 29.1 |
| 4 | −126.764 | 1.14 | | |
| 5 | −76.609 | 1.20 | 1.69895 | 30.1 |
| 6 | 81.813 | 0.15 | | |
| 7 | 37.369 | 7.10 | 1.72916 | 54.7 |
| 8 | −125.742 | 0.19 | | |
| 9 | 93.872 | 1.20 | 1.66565 | 35.6 |
| 10 | 26.683 | 5.20 | | |
| 11 | −101.032 | 1.00 | 1.69895 | 30.1 |
| 12 | 238.841 | 1.47 | | |
| 13 | 103.862 | 2.56 | 1.59522 | 67.7 |
| 14 | −218.290 | 1.56 | | |
| 15(stop) | ∞ | (variable) | | |
| 16 | −24.117 | 4.59 | 1.49700 | 81.5 |
| 17 | −16.550 | 1.00 | 1.61340 | 44.3 |
| 18 | 229.062 | 0.18 | | |
| 19* | 142.851 | 6.38 | 1.80400 | 46.5 |
| 20* | −38.835 | 0.22 | | |
| 21 | 118.844 | 9.93 | 1.49700 | 81.5 |
| 22 | −32.680 | (variable) | | |
| 23 | 131.089 | 11.18 | 1.90043 | 37.4 |
| 24 | −30.799 | 1.40 | 1.69895 | 30.1 |
| 25 | 110.828 | 9.27 | | |
| 26 | −27.069 | 1.40 | 1.51742 | 52.4 |
| 27 | −116.915 | 11.39 | | |
| Image plane | ∞ | | | |

Aspheric data

Third surface

K = 0.00000e+000 A 4 = −1.06225e−006
A 6 = −1.00633e−009 A 8 = 1.52206e−012
A10 = −2.70999e−015

Nineteenth surface

K = 0.00000e+000 A 4 = −2.30462e−006
A 6 = −1.47387e−009 A 8 = 1.15791e−011
A10 = −5.87714e−014

Twentieth surface

K = 0.00000e+000 A 4 = 3.36890e−006
A 6 = −1.69809e−009 A 8 = 3.33519e−011
A10 = −8.16780e−014

| | |
|---|---|
| Focal length | 48.47 |
| F-number | 1.45 |
| Half angle of view (°) | 24.05 |
| Image height | 21.64 |
| Overall lens length | 108.84 |
| BF | 11.39 |
| d15 | 13.02 |
| d22 | 5.53 | lens unit data

| unit | starting surface | focal length |
|---|---|---|
| 1 | 1 | 161.15 |
| 2 | 16 | 45.92 |
| 3 | 23 | −173.65 |

Numerical Example 3

UNIT: mm
SURFACE DATA

| SURFACE NO. | r | d | nd | vd |
|---|---|---|---|---|
| 1 | −43.062 | 1.40 | 1.51742 | 52.4 |
| 2 | 140.901 | 0.79 | | |
| 3 | 1095.628 | 7.07 | 1.80400 | 46.5 |
| 4 | −22.856 | 1.40 | 1.80610 | 33.3 |
| 5 | −86.499 | 0.15 | | |
| 6 | 56.127 | 4.12 | 2.00100 | 29.1 |
| 7 | −154.674 | 0.15 | | |
| 8 | 30.264 | 5.64 | 1.49700 | 81.5 |
| 9 | −134.322 | 1.20 | 1.80610 | 33.3 |
| 10 | 27.379 | 4.47 | | |
| 11(stop) | ∞ | (variable) | | |
| 12 | −25.726 | 4.13 | 1.53775 | 74.7 |
| 13 | −16.107 | 1.00 | 1.58144 | 40.8 |
| 14 | −939.774 | 0.19 | | |
| 15* | 94.103 | 5.64 | 1.80400 | 46.5 |
| 16* | −47.404 | 2.99 | | |
| 17 | −155.612 | 7.09 | 1.49700 | 81.5 |

-continued

| | | | | |
|---|---|---|---|---|
| 18 | −28.031 | (variable) | | |
| 19 | 139.996 | 7.64 | 1.83481 | 42.7 |
| 20 | −37.804 | 1.40 | 1.51742 | 52.4 |
| 21 | 49.931 | 8.68 | | |
| 22 | −26.373 | 1.40 | 1.85478 | 24.8 |
| 23 | −52.495 | 11.48 | | |
| Image plane | ∞ | | | |

Aspheric data

Fifteenth surface

K = 0.00000e+000 A 4 = 1.06072e−006
A 6 = 8.78919e−009 A 8 = −9.37531e−012
A10 = −4.28705e−014

Sixteenth surface

K = 0.00000e+000 A 4 = 9.84757e−006
A 6 = 1.00124e−008 A 8 = 2.52238e−011
A10 = −1.03065e−013

| | |
|---|---|
| Focal length | 48.49 |
| F-number | 1.85 |
| Half angle of view (°) | 24.04 |
| Image height | 21.64 |
| Overall lens length | 91.98 |
| BF | 11.48 |
| d11 | 12.07 |
| d18 | 1.90 | lens unit data

| unit | starting surface | focal length |
|---|---|---|
| 1 | 1 | 93.89 |
| 2 | 12 | 47.66 |
| 3 | 19 | −95.84 |

Numerical Example 4

UNIT: mm
SURFACE DATA

| SURFACE NO. | r | d | nd | vd |
|---|---|---|---|---|
| 1 | 83.845 | 1.60 | 1.51633 | 64.1 |
| 2 | 40.231 | 10.21 | | |
| 3 | −39.960 | 1.40 | 1.85478 | 24.8 |
| 4 | 134.859 | 7.36 | 1.90043 | 37.4 |
| 5 | −50.254 | 0.13 | | |
| 6 | 61.001 | 5.39 | 2.05090 | 26.9 |
| 7 | −522.772 | 0.14 | | |
| 8 | 30.176 | 9.14 | 1.49700 | 81.5 |
| 9 | −268.608 | 1.40 | 1.65412 | 39.7 |
| 10 | 23.469 | 7.10 | | |
| 11(stop) | ∞ | (variable) | | |
| 12 | −29.446 | 4.98 | 1.49700 | 81.5 |
| 13 | −17.515 | 1.00 | 1.62004 | 36.3 |
| 14 | 2313.154 | 0.29 | | |
| 15* | 83.134 | 6.86 | 1.85400 | 40.4 |
| 16* | −49.433 | 0.34 | | |
| 17 | −171.026 | 5.90 | 1.49700 | 81.5 |
| 18 | −34.452 | (variable) | | |
| 19 | −602.391 | 11.94 | 1.59522 | 67.7 |
| 20 | −24.073 | 1.40 | 1.60342 | 38.0 |
| 21 | −54.787 | 9.04 | | |
| 22 | −31.495 | 1.40 | 1.51742 | 52.4 |
| 23 | −236.395 | 13.23 | | |
| Image plane | ∞ | | | |

-continued

Aspheric data

Fifteenth surface

K = 0.00000e+000 A 4 = −1.65247e−006
A 6 = 2.56006e−009 A 8 = −2.53295e−012
A10 = 6.02587e−015

Sixteenth surface

K = 0.00000e+000 A 4 = 3.95316e−006
A 6 = 2.77461e−009 A 8 = −1.56218e−012
A10 = 9.60949e−015

| | |
|---|---|
| Focal length | 48.49 |
| F-number | 1.45 |
| Half angle of view (°) | 24.04 |
| Image height | 21.64 |
| Overall lens length | 116.56 |
| BF | 13.23 |
| d11 | 13.04 |
| d18 | 3.28 | lens unit data

| unit | starting surface | focal length |
|---|---|---|
| 1 | 1 | 120.01 |
| 2 | 12 | 53.18 |
| 3 | 19 | −301.57 |

Numerical Example 5

UNIT: mm
SURFACE DATA

| SURFACE NO. | r | d | nd | vd |
|---|---|---|---|---|
| 1 | 126.704 | 1.70 | 1.48749 | 70.2 |
| 2 | 27.528 | 12.70 | | |
| 3 | −74.506 | 2.35 | 1.90366 | 31.3 |
| 4 | −66.709 | 10.49 | | |
| 5 | −39.060 | 1.40 | 1.69895 | 30.1 |
| 6 | 32.163 | 12.34 | 1.69680 | 55.5 |
| 7 | −53.800 | 0.14 | | |
| 8 | 52.777 | 6.50 | 2.00069 | 25.5 |
| 9 | −289.716 | 6.34 | | |
| 10 | 50.896 | 1.60 | 1.63980 | 34.5 |
| 11 | 19.407 | 8.02 | 1.49700 | 81.5 |
| 12 | 55.437 | 3.91 | | |
| 13(stop) | ∞ | (variable) | | |
| 14 | −25.607 | 5.02 | 1.53775 | 74.7 |
| 15 | −15.308 | 1.00 | 1.66565 | 35.6 |
| 16 | −164.509 | 0.20 | | |
| 17* | 136.000 | 5.69 | 1.80400 | 46.5 |
| 18* | −40.871 | 0.25 | | |
| 19 | −340.430 | 7.58 | 1.59282 | 68.6 |
| 20 | −28.398 | (variable) | | |
| 21 | 277.120 | 4.90 | 2.00100 | 29.1 |
| 22 | −53.782 | 1.20 | 1.66565 | 35.6 |
| 23 | 56.773 | 5.38 | | |
| 24 | −50.613 | 6.32 | 1.49700 | 81.5 |
| 25 | −23.414 | 1.40 | 1.85478 | 24.8 |
| 26 | −65.884 | 12.05 | | |
| Image plane | ∞ | | | |

-continued

Aspheric data

Seventeenth surface

K = 0.00000e+000 A 4 = −1.82238e−006
A 6 = 2.05609e−008 A 8 = −4.33181e−012
A10 = 9.45378e−014

Eighteenth surface

K = 0.00000e+000 A 4 = 1.04553e−005
A 6 = 2.00801e−008 A 8 = −5.62650e−012
A10 = 1.48711e−013

| Focal length | 33.99 |
|---|---|
| F-number | 1.45 |
| Half angle of view (°) | 32.48 |
| Image height | 21.64 |
| Overall lens length | 131.16 |
| BF | 12.05 |
| d13 | 10.21 |
| d20 | 2.47 | lens unit data

| unit | starting surface | focal length |
|---|---|---|
| 1 | 1 | 55.10 |
| 2 | 14 | 39.31 |
| 3 | 21 | −73.33 |

TABLE 1

CONDITIONAL EXPRESSION

| | | (1) | (2) | (3) | (4) | (5) | (6) | (7) | (8) | (9) |
|---|---|---|---|---|---|---|---|---|---|---|
| NUMERICAL | 1 | −3.272 | 2.005 | 0.961 | 0.057 | 2.501 | 0.380 | 3.881 | 1.304 | 1.848 |
| EXAMPLE | 2 | −5.374 | 0.865 | 0.975 | 0.037 | 3.323 | 0.285 | 3.782 | 1.270 | 2.244 |
| | 3 | −4.349 | 1.035 | 1.304 | 0.014 | 1.936 | 0.508 | 2.011 | 1.439 | 1.897 |
| | 4 | −3.936 | 0.985 | 1.555 | 0.039 | 2.475 | 0.443 | 5.671 | 1.522 | 2.404 |
| | 5 | −3.973 | 1.205 | 1.178 | 0.040 | 1.621 | 0.713 | 1.865 | 1.171 | 3.858 |

Figure 16:
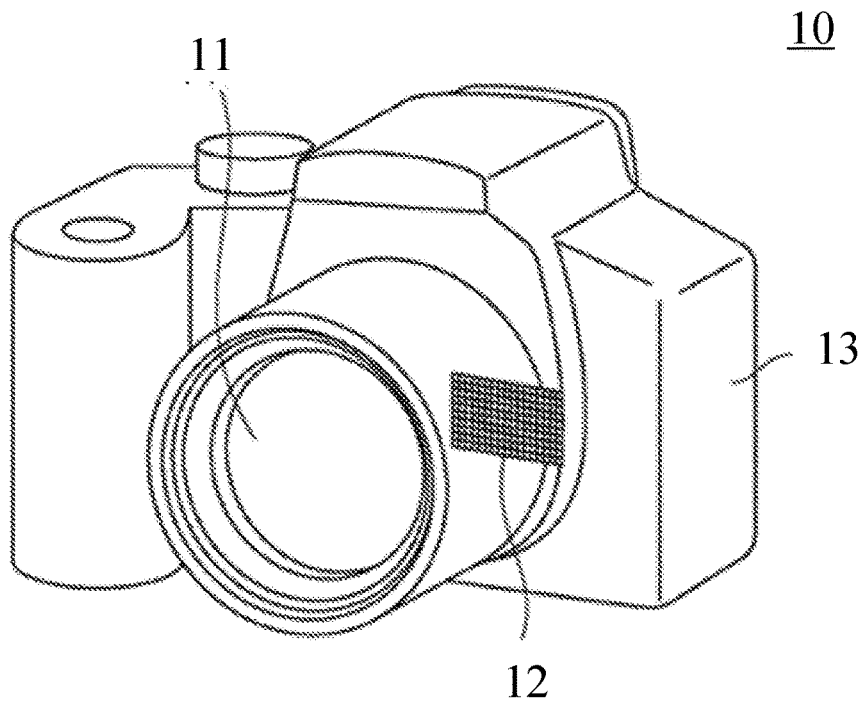
FIG. 16 is a schematic diagram of an imaging apparatus including the optical system according to each example.

Referring now to FIG. 16, a description will be given of an embodiment of a digital still camera (imaging apparatus 10) using the optical system according to each example as an imaging optical system. FIG. 16 is a schematic diagram of the imaging apparatus 10 including the optical system according to each example.

In FIG. 16, reference numeral 13 denotes a camera body, and reference numeral 11 denotes an imaging optical system including any of the optical systems described in Examples 1 to 5. Reference numeral 12 denotes an image sensor (photoelectric conversion element) such as a CCD sensor and a CMOS sensor that receives an optical image formed by the imaging optical system 11 and performs a photoelectric conversion. The camera body 13 may be a so-called single-lens reflex camera having a quick turn mirror or a so-called mirrorless (non-reflex) camera having no quick turn mirror.

Thus, a compact and high-quality imaging apparatus that can provide quick focusing can be obtained when the optical system according to each example is applied to the imaging apparatus 10 such as a digital still camera. The optical system according to each example is applicable to other imaging apparatuses such as a video camera.

Each example can provide a compact optical system that can provide quick focusing and have a large diameter and high image quality, and an imaging apparatus having the same.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-083698, filed on Apr. 25, 2019, which is hereby incorporated by reference herein in its entirety.

What is claimed is:

1. An optical system comprising, in order from an object side to an image side, a first lens unit having a positive refractive power, a second lens unit having a positive refractive power, and a third lens unit having a negative refractive power,
   wherein the second lens unit moves and a distance between adjacent lens units changes during focusing,
   wherein the second lens unit includes a cemented lens closest to an object,
   wherein the cemented lens includes a positive lens and a negative lens disposed on the image side of the positive lens, and
   wherein the following conditional expressions are satisfied:

$$-10.0 < (r2LAP + r1LAP)/(r2LAP - r1LAP) < -1.00$$

$$0.50 < (r2LAN + r1LAN)/(r2LAN - r1LAN) < 10.0$$

where r1LAP is a radius of curvature of a surface of the positive lens on the object side, r2LAP is a radius of curvature of a surface of the positive lens on the image side, r1LAN is a radius of curvature of a surface of the negative lens on the object side, and r2LAN is a radius of curvature of a surface of the negative lens on the image side.

2. The optical system according to claim 1, wherein the following conditional expression is satisfied:

$$0.81 < |D12/r2LAP| < 2.00$$

where D12 is a distance on an optical axis from a surface of the first lens unit closest to an image to a surface of the second lens unit closest to the object.

3. The optical system according to claim 1, wherein the following conditional expression is satisfied:

$$0.002 < (nLAN - nLAP)/(nLAN + nLAP) < 0.075$$

where nLAP is a refractive index for d-line of the positive lens, and nLAN is a refractive index for the d-line of the negative lens.

4. The optical system according to claim 1, wherein the following conditional expression is satisfied:

$$1.00 < f1/f < 5.00$$

where f is a focal length of the optical system when infinity is focused, and f1 is a focal length of the first lens unit.

5. The optical system according to claim 1, wherein the following conditional expression is satisfied:

$$0.10 < f2/f < 1.20$$

where f is a focal length of the optical system when infinity is focused, and f2 is a focal length of the second lens unit.

6. The optical system according to claim 1, wherein the following conditional expression is satisfied:

$$0.50 < |f3|/f < 10.00$$

where f is a focal length of the optical system when infinity is focused, and f3 is a focal length of the third lens unit.

7. The optical system according to claim 1, wherein the following conditional expression is satisfied:

$$0.50 < D12/sk < 2.50$$

where D12 is a distance on an optical axis from a surface of the first lens unit closest to an image to a surface of the second lens unit closest to the object, and sk is a backfocus.

8. The optical system according to claim 1, wherein the following conditional expression is satisfied:

$$1.00 < td/f < 6.00$$

where f is a focal length of the optical system when infinity is focused, and td is an overall lens length of the optical system.

9. The optical system according to claim 1, further comprising an aperture stop between the first lens unit and the second lens unit.

10. The optical system according to claim 1, wherein the first lens unit includes three positive lenses.

11. The optical system according to claim 1, wherein the first lens unit has three negative lenses.

12. The optical system according to claim 1, wherein the second lens unit has three positive lenses.

13. An imaging apparatus comprising:
the optical system according to claim 1; and
an image sensor configured to receive light from the optical system.

* * * * *